No. 883,558. PATENTED MAR. 31, 1908.
J. F. MOY.
ATTACHMENT FOR NUTCRACKERS.
APPLICATION FILED JULY 18, 1906.

WITNESSES:
Frank Hough
F. S. Elmore

INVENTOR
Jin. F. Moy
By Victor J. Evans
Attorney

UNITED STATES PATENT OFFICE.

JIN FUEY MOY, OF WOODCLIFF, NEW JERSEY.

ATTACHMENT FOR NUTCRACKERS.

No. 883,558.  Specification of Letters Patent.  Patented March 31, 1908.

Application filed July 18, 1906. Serial No. 326,734.

*To all whom it may concern:*

Be it known that I, JIN FUEY MOY, a subject of the Emperor of China, residing at Woodcliff, in the county of Bergen and State of New Jersey, have invented new and useful Improvements in Attachments for Nutcrackers, of which the following is a specification.

This invention relates to nut crackers and especially to a chestnut splitting attachment therefor, and has for its objects to produce a comparatively simple, inexpensive device of this character which may be readily applied for use, and one whereby the chestnut hulls may be rapidly split or incised in the operation of preparing them for roasting.

With these and other objects in view, the invention comprises the novel features of construction and combination of parts more fully hereinafter described.

Figure 1:
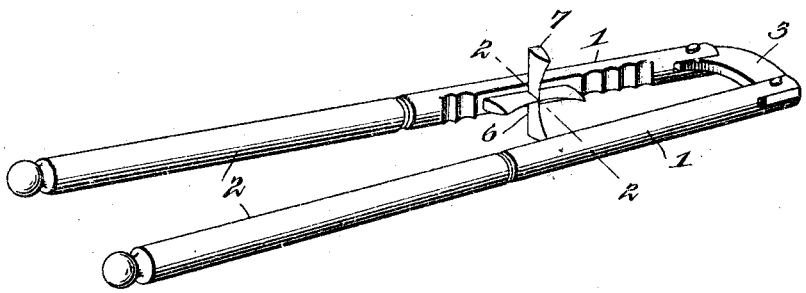
Figure 2:
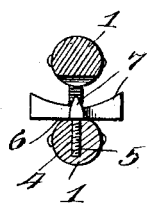

In the accompanying drawings: Figure 1 is a perspective view of a pair of nut crackers equipped with an attachment embodying the invention. Fig. 2 is a section taken on the line 2—2 of Fig. 1.

Referring to the drawings, it will be seen that the nut crackers which are of the usual or any preferred construction and material comprise a pair of coöperating, relatively movable nut cracking members or jaws 1 provided with handles 2 and pivotally connected at their forward ends by means of a link 3.

Detachably engaged with one of the jaws 1 by means of a screw-threaded element or shank 4 tapped into a suitable transverse opening or socket 5 in the jaw is a chestnut splitting member or head 6 preferably comprising a pair of perpendicularly crossed portions or blades 7 and having sharpened cutting edges disposed toward the active face of the opposite member or jaw 1, the blades which are arranged in the general form of a Greek cross having their sharpened edges concaved from end to end. The blades are flat at the back and the jaw to which the blades are attached is also flat, so that either pair of oppositely disposed blades will bear firmly against the jaw and thus prevent breakage, and the transversely extending blades bear at their inner ends against the flat portion of the said jaw, thereby serving to support the said blades and prevent easy breakage.

In practice, a chestnut is introduced between the jaws 1 with its ovate part or side seated upon the concaved sharpened edges of the blades and its flat side or portion disposed toward the inner face of the opposite jaw, whereupon movement of the jaws toward each other causes the blade 7 to slit or incise the hull to prepare the nut for roasting or the like, it being apparent that in the operation of the device the nuts may be rapidly and effectually prepared for the purpose named.

While I have described the attachment as being designed for the treatment of chestnuts and while it is especially adapted for said purpose, it is apparent that the same may be advantageously utilized in breaking the shells of various kinds of nuts and consequently forms a desirable attachment for the tool.

From the foregoing it is apparent that I produce a simple device admirably adapted for the attainment of the ends in view, it being apparent that in attaining these ends minor changes in the details herein set forth may be resorted to without departing from the spirit of the invention.

Having thus fully described my invention, what I claim is:

A nut cracker comprising a pair of jaws, one having a flat portion, and serrations adjacent the said portion, the flat portion being provided with a tapped opening, and a link to which the jaws are hingedly connected, with an attachment consisting of a plurality of radially and diametrically disposed blades each flat at the back to bear against the flat portion of the said jaw and each oppositely disposed pair forming a single concaved cutting edge, and a central threaded shank extending at right angles to the flat sides of the blades and having threaded engagement with the said opening.

In testimony whereof, I affix my signature in presence of two witnesses.

JIN FUEY MOY.

Witnesses:
JOHN E. HARING,
CORA A. HARING.